United States Patent
Vogelgsang et al.

(10) Patent No.: US 11,553,719 B2
(45) Date of Patent: Jan. 17, 2023

(54) METHOD AND COMPOSITION FOR CONTROLLING FUNGAL PHYTOPATHOGENS

(71) Applicant: Agroscope, Institut fur Nachhaltigkeitswissenschaften, Zurich (CH)

(72) Inventors: Susanne Vogelgsang, Waldshut-Tiengen (DE); Hans-Rudolf Forrer, Oberweningen (CH); Heinz Krebs, Otelfingen (CH)

(73) Assignee: Agroscope, Institut fur Nachhaltigkeitswissenschaften, Zurich (CH)

(*) Notice: Subject to any disclaimer, the term of this patent is extended or adjusted under 35 U.S.C. 154(b) by 371 days.

(21) Appl. No.: 15/422,242

(22) Filed: Feb. 1, 2017

(65) Prior Publication Data

US 2017/0360050 A1 Dec. 21, 2017

Related U.S. Application Data

(63) Continuation of application No. 14/107,479, filed on Dec. 16, 2013, now abandoned.

(30) Foreign Application Priority Data

Dec. 20, 2012 (EP) .................... 12198782

(51) Int. Cl.
*A01N 65/08* (2009.01)
*A61K 36/00* (2006.01)

(52) U.S. Cl.
CPC .................. *A01N 65/08* (2013.01)

(58) Field of Classification Search
None
See application file for complete search history.

(56) References Cited

U.S. PATENT DOCUMENTS

| | | | | |
|---|---|---|---|---|
| 5,589,381 A | * | 12/1996 | Neyra | A01N 63/22 435/252.5 |
| 6,448,228 B1 | * | 9/2002 | Filippini | A01N 47/12 514/3.3 |
| 2011/0070322 A1 | * | 3/2011 | Bessette | A01N 31/04 424/747 |
| 2013/0078272 A1 | * | 3/2013 | Villas-Boas | C07D 493/08 424/195.15 |

FOREIGN PATENT DOCUMENTS

| | | | |
|---|---|---|---|
| CN | 1969636 A | * | 11/2005 |
| CN | 101107934 A | * | 1/2008 |
| JP | 04021617 A | * | 1/1992 |

OTHER PUBLICATIONS

Hu Tongle Acta Phytophatologoca Sinica. 2008. vol. 38, No. 6, pp. 619-625. CABA Abstract of this document also enclosed. (Year: 2008).*

Wang et al. Front. Agric. China. 2007. vol. 1, No. 1, pp. 43-46 (Year: 2007).*

Ahn, Young-Joon, et al.; Antifungal activity and mode of action of Galla rhois-derived phenolics against phytopathogenic funge; Pesticide Biochemistry and Physiology 81 (2005) pp. 105-112 (Year: 2005).*

Wang et al. Front. Agric. China. 2007. vol. 1, No. 1, pp. 43-46, 2007 (Year: 2007).*

* cited by examiner

*Primary Examiner* — Michael Barker
*Assistant Examiner* — Randall O Winston
(74) *Attorney, Agent, or Firm* — Locke Lord LLP

(57) ABSTRACT

The present invention relates to a method for controlling fungal phytopathogens using *Galla chinensis* preparations, and to a fungicidal composition comprising *Galla chinensis* in combination with at least one phytologically acceptable adhesive.

14 Claims, 6 Drawing Sheets

METHOD AND COMPOSITION FOR CONTROLLING FUNGAL PHYTOPATHOGENS

This Application is a Continuation of application Ser. No. 14/107,479 filed on Dec. 16, 2013. application Ser. No. 14/107,479 which claims priority to European Patent Application Ser. No. 12 198 782.0, filed Dec. 20, 2012. The entire contents of the aforementioned patent applications are incorporated herein by this reference.

FIELD OF THE INVENTION

The present invention relates to a method for controlling fungal phytopathogens using *Galla chinensis* preparations, and to a fungicidal composition comprising *Galla chinensis* in combination with at least one suitable adhesive.

BACKGROUND

Botanicals based on preparations from medicinal and aromatic plants have high potential for the control of various fungal pathogens. Frequent examples include garlic (*Allium sativum* L.), caraway (*Carum carvi* L.), meadowsweet (*Filipendula ulmaria* L.), lavender (*Lavandula stoechas* L.), chamomile (*Matricaria chamomilla* L.), rosemary (*Rosmarinus officinalis* L.), sage (*Salvia fruticosa* Mill.), thyme (*Thymus vulgaris* L.) and yucca (*Yucca schidigera* Roezl ex Ortgies) against fungal pathogens of the genera *Aspergillus, Candida, Cladosporium, Fusarium, Leptosphaeria, Penicllium* and *Verticillium*.

Other plant-based preparations that have been investigated for an antimicrobial activity include oil from neem trees (*Azadiracta indica* A. Juss.) and extracts of Chinese galls (*Galla chinensis*; syn. *G. rhois*, Chinese sumac, Wu Bei Zi). Tian et al. (Food Chem. 113, 171-179, 2009) report an antibacterial activity of *G. chinensis* extracts, but no fungicidal activity. Ahn et al. (2005) *Pesticide Biochemistry and Physiology* 81, 105-112, described a fungicidal activity of methanol extracts of *G. chinensis*, particularly attributed to methyl gallate and gallic acid. However, Ahn et al. (2005) observed antifungal effects only from methanol extracts of *G. chinensis* applied on leaves and not from water or other extracts nor from preparations including the complete material of the botanical *G. chinensis*.

WO-A-2011/138345 discloses fungicidal compositions comprising a gallic acid ester in combination with one or more further fungicide(s).

SUMMARY OF THE INVENTION

The technical problem underlying the present invention is the provision of a novel regiment for controlling fungal phytopathogens.

The solution to the above technical problem is provided by the embodiments of the present invention described herein and as defined in the claims.

In particular, the present invention provides a method for controlling fungal phytopathogens comprising the step of contacting the plants, parts thereof, their seed, their soil and/or their habitat with an effective amount of a preparation containing *Galla chinensis* and/or a composition containing such preparation. Alternatively, the invention also relates to a corresponding method using an aqueous extract of *G. chinensis*.

BRIEF DESCRIPTION OF THE DRAWINGS

The above and other features of the present invention will now be described in detail with reference to certain exemplary embodiments thereof illustrated the accompanying drawings, which are given hereinbelow by way of illustration only, and thus are not limitative of the present invention, and wherein.

Figure 1:
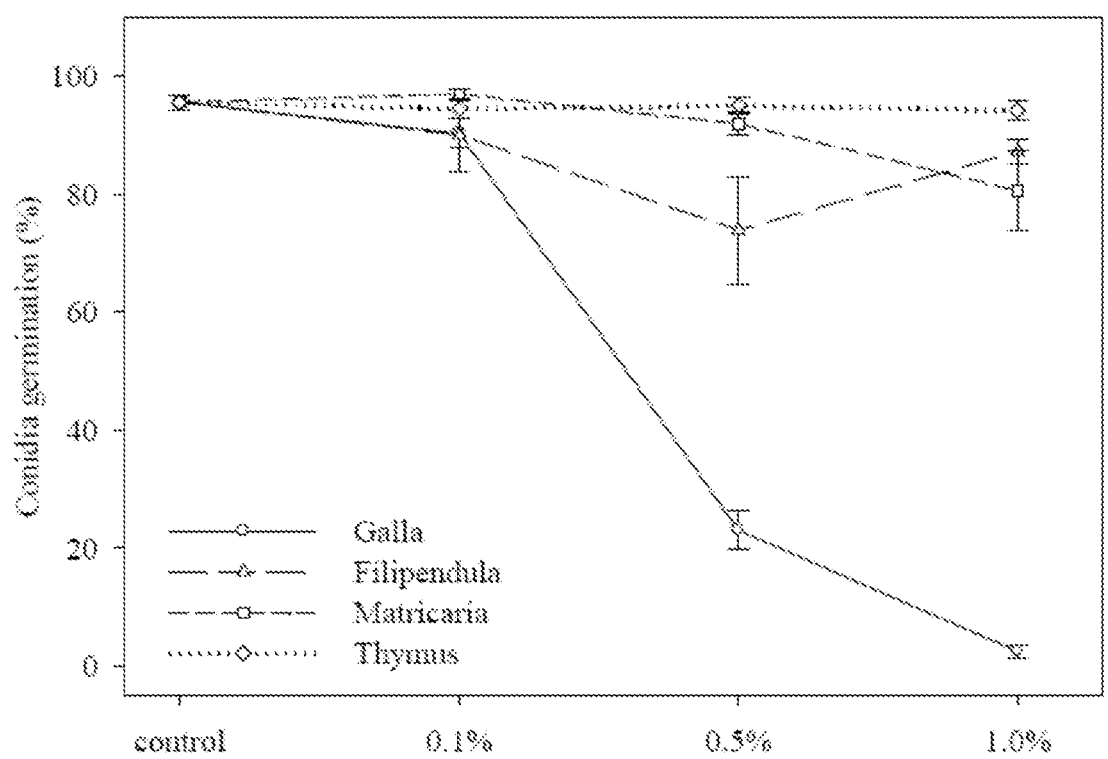
FIG. 1 is a graph that depicts an in vitro experiment showing the effect of four botanicals at three different concentrations in aqueous suspensions on conidia germination of *Microdochium majus* in vitro. Galla: *Galla chinensis*, Filipendula: *Filipendula ulmaria*, Matricaria: *Matricaria chamomilla*, Thymus: *Thymus vulgaris*. Error bars indicate the standard error of the mean.

The following non-limiting example further illustrates the present invention.

DETAILED DESCRIPTION OF THE INVENTION

Chinese galls (synonyms: *Galla chinensis, G. rhois*, Chinese sumac, Wu Bei Zi) are produced by aphids feeding on leaves of Chinese sumac or nutgall tree (*Rhus* spp.) (see, e.g., Ahn et al. (2005), supra).

In comparison to previous antimicrobial studies using *G. chinensis* extracts or individual compounds such as gallic acid and esters thereof it was surprisingly found according to the present invention that preparations containing substantially complete *G. chinensis*, e.g. *G. chinensis* in pulverized form, show superior antifungal properties as demonstrated by an up to 100% reduction of conidia germination and mycelium growth of *Microdochium majus*. According to the present invention, it is therefore surprisingly not necessary—contrary to the teaching of the prior art—to produce extracts of *G. chinensis* or to even synthetically manufacture certain components present *G. chinensis* in order to achieve a fungicidal effect.

According to the present invention the term "preparation containing *Galla chinensis*" is a preparation comprising material from substantially complete Chinese galls. Preferably, the preparation contains *G. chinensis* in pulverized form such as a meal or powder of *G. chinensis*. Typically, the preparation contains further phytologically acceptable, i.e. for phytoglogical applications suitable, ingredients such as carriers, excipients, diluents, further fungicidal compounds, adhesives and/or emulsifiers. The *G. chinensis* preparations of the invention preferably contain about 0.01 to about 99 weight %, more preferably about 0.1 to about 50 weight %, even more preferred about 0.1 to about 10 weight %, still more preferred about 0.1 to about 2 weight %, particularly preferred about 0.1 to about 1 weight % of the active ingredient, in particular *G. chinensis* ground to an appropriate mesh size. The content of the active ingredient typically varies depending on the route of administration and/or the plant, parts thereof, seed etc. to be treated. For example, for an application of the *G. chinensis* preparation on seeds, the preparation or composition of the invention may have a content of *G. chinensis* of about 0.1 to about 4 weight %, more preferably about 0.1 to about 2 weight %, whereas for application on plant parts such as leaves typically using spraying devices, the content may be about 0.1 to about 1 weight %, more preferably about 0.1 to about 0.5 weight % or lower. In other embodiments of the invention, the preparation may also be substantially pure ground *G. chinensis.*

Methods for producing such *G. chinensis* preparations are known in the art. Preferably, galls are ground to the appropriate mesh size, e.g. from about 0.001 to about 0.2 mm, more preferably from about 0.005 to about 0.1 mm, even more preferred about 0.01 to about 0.08 mm, typically using commercially available milling equipment. The meal is then typically mixed with the further ingredients in a known manner.

According to preferred embodiments of the present invention, the *G. chinensis* preparation contains at least one further fungicide. Fungicides are known to the skilled person and commercially available from various suppliers (see, e.g. the respective disclosure in WO-A-2011/138345). Appropriate selections for specific phytopathogens and their respective plant hosts are also described in the prior art, e.g. Hewitt, H. G. 1998: Fungicides in crop protection: Oxford University Press, Incorporated, 232 pp.

A particularly preferred composition containing *G. chinensis* for application in the inventive method further comprises one or more phytologically acceptable adhesive(s). A "phytologically acceptable" adhesive is a compound or composition providing adherence of a fungicidal active or composition to the targeted object (i.e. plants, their parts such as crop material, seed, soil, habitat etc.) while substantially not interfering with any of the relevant properties of the targeted object such as viability, propagation, usefulness (e.g. use for food or other purposes) etc. Thus, adhesives useful in the present invention are essentially bio-compatible. Corresponding adhesives are known to the skilled person (see, for example, Legro, R. J. 2004: Organic seed & coating technology: a challenge and opportunity. In *First World Conference on Organic Seed*, edited by E. L. Van Bueren, R. Ranganathan and N. Sorensen. Rome, Italy: FAO; and Backman, P. A. (1978): Fungicide formulation—relationship to biological activity. Annual Review of Phytopathology 16: 211-237) and commercially available from various suppliers. Preferred examples of adhesives for use in the present invention include, but are not limited to, starch, talcum, and synthetic binders such as DiscoAg-Red (L203) and, particularly preferred, Organic Binder (A6.6041) (Incotec Holding BV, Enkhuizen, The Netherlands). The amount of adhesive(s) present in the composition according to the invention depends on various factors such as the object to be treated and the adhesive(s) used, and may be optimized for the selected object/adhesive in combination with the respective *G. chinensis* preparation by routine experimentation. For synthetic or organic binders such as those available from Incotec Holding BV, The Netherlands, recommended concentrations typically lie in the range of from about 5 weight % to about 50 weight % usually depending on the mode of administration and/or the plant, plant parts, seeds etc. to be treated. For example, compositions for treatment of seeds typically contain about 40 to about 50 weight % adhesive, whereas compositions for leave treatments usually contain much less adhesive, e.g. about 1 to about 10 weight %, more preferably about 2 to about 8 weight % such as about 5 weight % adhesive.

A particularly preferred mode of the inventive method comprises forming a slurry, i.e. a dispersion, of a *G. chinensis* preparation in a liquid, e.g. water, optionally containing further components, preferably an adhesive (or more of them). The "slurry method" is particularly suitable for the treatment of plant seeds being coated with the slurry, which are then typically dried.

In certain preferred embodiments of the inventive method, the co-application of *G. chinensis* preparation and an adhesive (or more than one) may be carried out sequentially, i.e. the *G. chinensis* preparation and the adhesive(s) may not be present in the same composition. An example is an inventive method wherein, firstly, the adhesive (typically a composition containing the adhesive(s)) is applied on the targeted object (i.e. plant, plant parts, seed), and then contacting the target(s) with the *G. chinensis* preparation. According to a further embodiment, this mode of the present invention is further extended to a so-called "sandwich approach" by including a further step of treating the targeted object(s) with adhesive(s) again. Such embodiments of the present invention are particularly useful for the treatment of seeds. Also after such treatment the seed is usually subjected to a drying process.

In further preferred embodiments of the present invention the treatment with *G. chinensis* is combined with a heat treatment, preferably using hot air, preferentially when applied for 1 to 5 days to plant seeds. Preferably, the hot air has a temperature of from about 55 to about 80° C., more preferably from about 60 to about 75° C. Such combined treatments provide a synergistic fungicidal effect. Heat application methods using hot air have been described in the art. For example, Forsberg (*Control of Cereal Seed-borne Diseases by Hot Humid Air Seed Treatment*. Uppsala, Swedish University of Agricultural Sciences, 49 pp., PhD thesis, 2004) describes fungicidal methods using humid air. Typically, humid air for use in the present invention has a relative humidity of more than about 85%. According to alternative embodiments, dry hot air is used, preferably having a relative humidity of not more than about 5%. Processes using dry hot air have been described in the art as well (see, e.g., Gilbert et al. (205) *Canadian Journal of Plant Pathology-Revue Canadienne de Phytopathologie* 27, 448-452).

Preferred fungal pathogens to be controlled by the method according to the invention may be selected from Ascomycetes, Basidiomycetes and Oomycetes. Preferred phytopathogenic Ascomycetes vulnerable to the inventive method include *Microdochium* spp., in particular *M. majus*, *M. nivale*, *M. oryzae*, *M. tabacinum* and *M. triticicola*, *Gibberella* spp., *Claviceps* spp., *Gaeumannomyces* spp., *Epichloe* spp., *Sclerotinia* spp., *Leptosphaeria* spp., *Pyrenophora* spp., *Venturia* spp. and *Mycosphaerella* spp., Preferred Basidiomycetes controllable by the method of the invention include *Ustilago* spp., *Tilletia* spp. and *Typhula* spp., Preferred Oomycetes to which the inventive method may be applied include *Phytium* spp. and *Phytophthera* spp. With respect to indications of fungal pathogens as mentioned herein, it is to be understood that, if the respective teleomorph is mentioned, the invention intends also the respective anamorph, and vice versa.

Plants (parts thereof, e.g. crop material, seed etc.) to be protected against corresponding infections by pathogenic fungi include cereals, e.g. wheat, rye, barley, triticale, oats, rice or maize; beets such as sugar beet or fodder beet; fruits, in particular pomes, stone fruits or soft fruits, e.g. apples, pears, plums, peaches, almonds, cherries, strawberries, raspberries, blackberries or gooseberries; leguminous plants such as lentils, peas, alfalfa, clover or soybeans; oil plants, e.g. rapes, mustard, olives, sunflowers, coconut, cocoa beans, castor oil plants, oil palms, ground nuts or soybeans; cucurbits, in particular squashes, cucumber and melons; fiber plants such as cotton, flax, hemp and jute; citrus fruits, e.g. oranges, lemons, grapefruits or mandarins; vegetables, in particular spinach, lettuce, asparagus, cabbages, carrots, onions, tomatoes, potatoes, cucurbits or paprika; lauraceous plants, e.g. avocados, cinnamon and camphor; grapes; tobacco; *Stevia*; natural rubber plants, ornamental and forestry plants such as flowers, shrubs, broad-leaved trees or evergreens such as conifers; and grasses.

Highly preferred plants and their corresponding pathogenic fungi as targets of the inventive methods are cereals, vegetables, leguminous forage crops including alfalfa and clover, and grasses including forage grasses, lawns and pastures, in particular the above-mentioned preferred examples thereof.

The present invention further relates to the fungicidal composition comprising a preparation containing *Galla chinensis* and at least one phytologically acceptable adhesive as outlined above. Preferred embodiments of such compositions have already been elaborated above. Particularly preferred compositions according to the invention comprise about 0.1 to about 2 weight % *G. chinensis* preparation and about 5 to about 50 weight % adhesive. Typically the rest is water or other suitable diluent, potentially containing further ingredients as outlined above.

Further subject matter of the present invention constitutes plant seeds, seedlings and subterranean plant parts (e.g. roots), or plants containing such plant parts, respectively, coated with a *G. chinensis* preparation or fungicidal composition as described herein. Alternatively, especially plant seed according to the invention may also be coated with an adhesive as described therein and then with the *G. chinensis* preparation, and optionally again with an adhesive, thus forming a plant seed coated with adhesive—*G. chinensis*, or coated with a sandwich of adhesive—*G. chinensis*—adhesive. In the latter coating embodiments, it is clear that the *G. chinensis* preparation itself usually does not contain adhesive(s).

EXAMPLES

Materials and Methods
Fungal Material and Inoculum Production of Starter Cultures For the experiments on conidia germination and mycelium growth, a single conidium strain of *Microdochium majus* (Mm0327) was selected. The strain was isolated in 2003 in an experimental field in Zurich-Reckenholz, Switzerland, from grains of the winter wheat cultivar 'Runal' and deposited as CBS 121295 at the public culture collection of the Fungal Biodiversity Centre, Centraalbureau voor Schimmelcultures, The Netherlands. At the research station Agroscope Reckenholz-Tanikon, a stock culture was maintained at 5° C. in screw cap slants (15 cm, diameter 1.5 cm), filled to ¾ of its volume with autoclaved shrub soil ("Staudenerde" [41% white peat, 36% bark humus, 20% expanded clay, 3% clay, pH 5.5-6.3], Obiter, Märwil, Switzerland), supplemented with 1% ground rolled oats and moistened with 3 mL sterile deionised water. For molecular identification of the *M. majus* strain (in vitro experiments) and for seed lots infected with *M. majus* (in planta experiments), a forward primer for *M. nivale* (EFNiv/F) and *M. majus* (EFMaj/F) and a reverse primer common for both species (EFMic/R) (Glynn et al. (2005) *Mycological Research* 109, 872-880) were used and confirmed the species status for both the strain and the pathogen within the seeds. Starter cultures of fungal inoculum were produced by placing individual aliquots from stock cultures in Petri plates (diameter 9 cm) containing potato dextrose agar (39 g $L^{-1}$; CM0139, Oxoid Ltd., Basingstoke, UK), supplemented with streptomycin sulphate (0.1 g $L^{-1}$; Fluka, Sigma-Aldrich, Buchs, Switzerland) (PDA+) after autoclaving for 20 min at 121° C. Plates were incubated for 6 to 7 days at 19±1° C. with a photoperiod of 12 h dark/12 h near UV light.

Botanicals
Dried and chopped flowers of *Matricaria chamomilla* (origin: Egypt), flowers of *Filipendula ulmaria* (origin: Bulgaria and Poland) and whole plants of *Thymus vulgaris* (origin: Poland and Peru) (purchased from Mäseler AG, Herisau, Switzerland and from Berg-Apotheke, Zurich, Switzerland) were finely ground with a centrifugal mill (mesh size 0.08 mm; Retsch ZM 200, Schieritz & Hauenstein AG, Arlesheim, Switzerland). Meal of *Galla chinensis* galls (origin: Sichuan, China; purchased from Berg-Apotheke, Zurich, Switzerland) was reduced to the same mesh size.

Example 1: In Vitro Experiment—Conidia Germination

In this experiment, for each of the four botanicals, 10 g powder were suspended in 100 mL autoclaved deionised water and stirred for 3 h at ambient temperature. The aqueous suspensions were subsequently filtered using fluted filters (diameter 15 cm, 520 A ½, Schleicher & Schuell, Riehen, Switzerland). Three concentrations of these preparations were tested, including 0.1, 0.5 and 1.0%. Microscope slides (76×26 mm) were placed in Petri plates (diameter 9 cm) onto moistened (2 mL sterile deionised water) filter papers (diameter 8.5 cm, Nr. 591, Schleicher & Schuell) and three water agar plugs (diameter 1 cm) were placed on each slide. Each treatment consisted of two Petri plates, resulting in a total of six agar plugs.

Conidia suspensions were obtained by washing each incubated plate of the starter cultures with 7 ml sterile deionised water and adjusting the resulting suspension to a concentration of $3.3 \times 10^4$ conidia $ml^{-1}$. For each botanical and each concentration, 15 µl extract were pipetted onto each agar plug. Sterile, deionised water served as the control treatment. To compare the efficacy of the botanicals with a synthetic fungicide, a treatment with Pronto® Plus (0.035%; 25.5% spiroxamine, 13.6% tebuconazole) was included. Extracts, water and fungicide solutions were allowed to evaporate for 20 min. Subsequently, 15 µl conidia suspension were pipetted onto the agar plugs. Petri plate lids were closed and plugs were incubated for 24 h at 10° C. and 70% rh in the dark. Conidia were killed and stained with one drop of a Pronto® Plus (0.19%) and Cotton blue (0.5%) mixture. The germination rate was assessed with the aid of a light microscope (400× magnification) by determining the ratio of germinated conidia from a total of 30 conidia within three different visual fields. A conidium was assigned as germinated when the germination tube was longer than the width of the conidium.

Example 2: In Vitro Experiment—Mycelium Growth

Autoclaved PDA medium in Schott flasks was placed in a water bath (60° C.) and while stirring constantly, supplemented with streptomycin sulphate and the desired quantities of the four botanical powders before pouring into Petri plates (diameter 9 cm): Concentrations of powders were 0.1, 0.5 and 1% (0.1 g, 0.5 g, 1 g powder 100 $mL^{-1}$ medium, respectively). PDA+ without powders served as the control treatment. Using a cork borer, mycelial plugs (diameter 0.5 cm) were cut from starter cultures and for each PDA plate, one plug was placed in the centre with the mycelial side facing the agar. For each treatment, five Petri plates were used. Plates were incubated in the dark at 20±1° C. and 50% rh for 6 days. Subsequently, radial growth was determined by measuring the diameter of the fungal colony at two positions (smallest and largest diameter) and calculating the average of both values.

Example 3: Incubation Chamber Experiment—Incidence of *M. majus* from Infected Seeds on Agar Winter wheat seeds (cultivar 'Siala') infected with *M. majus* (infection rate 25-30%) were treated with the botanicals *F. ulmaria*, *T. vulgaris* and *G. chinensis* and two different adhesives, "DiscoAg-Red" (L203; DR) and "Organic Binder" (A6.6041; OB) (Incotec Holding BV, Enkhuizen, The Netherlands). For each botanical, 2 g were used for 100 g seeds and for each adhesive, two different application methods were evaluated. The first method consisted of dispersing the powder with water and the adhesive in a liquid seed treater (Hege 11, inductor 190 V, volume 20 to 3000 g seeds, Hege Maschinenbau, Waldenburg, Germany), resulting in a slurry that was applied in a single step onto the seeds. For the second method, seeds were coated using a "sandwich" technique, in which seeds were first coated with the adhesive (Hege 11), followed by a powder application with a rotating machine (Turbula®, type 2A, 3×380 V, Willy A. Bachofen AG, Basel, Switzerland) and a second layer of the adhesive (Hege 11). Several preliminary trials were conducted to determine the most suitable concentration and amount of adhesive in terms of viscosity and adherence of the botanical (data not shown). For the slurry method, 100 g seeds were treated with 4.7 mL of DR or OB (both 40%) for *F. ulmaria* and *T. vulgaris* and with 4.5 mL of DR or OB (40%) for *G. chinensis*. For the coating method, 3.5 mL (2×1.75 mL) of DR or OB (50%) were used for all three botanicals. Treatments with the adhesives but without the botanicals as well as grains without any treatment were included as controls. Following treatment, seeds were air-dried at 30° C. for approximately 60 min. The treated and untreated seeds were placed on PDA+ agar in Petri plates (diameter 9 cm). For each treatment, ten plates with ten seeds in each plate were used. Plates were incubated for 6 days at 19±1° C. with a photoperiod of 12 h dark/12 h near UV light. Subsequently, the number of *M. majus* colonies growing from seeds was determined and expressed as incidence in %.

Example 4: Growth Chamber Experiment—Seedling Emergence from Soil

Experiment 1—Three Botanicals, One Application Method

Winter wheat seeds (cultivar 'Fiorina') infected with *M. majus* (infection rate 30%) were treated at Incotec with *F. ulmaria*, *T. vulgaris* and *G. chinensis* and the two adhesives DR and OB. For this, an encrusting and pelleting process (EPM03) with a rotary batch coater (Satec concept ML 2000, diameter 30 cm, SATEC seed coating, Elmshom, Germany) was used. For 100 g seed, 2 g of the respective botanical and 3.5 mL of DR or OB (50%) in complete mixes (slurry) were used. Treated seeds were dried for 5 min in unheated air. Treatments with the adhesives but without botanicals and untreated seeds served as controls. Seeds were sown in plastic trays (dimensions: 30×47×6 cm) containing moistened shrub soil (Obiter, Switzerland) at a depth of 2 cm. For each treatment, three trays with 100 seeds each (ten rows with ten seeds) were sown. After sowing, the soil was watered and trays were placed in a greenhouse for 24 h at 20±1° C. to stimulate germination. Trays were then wrapped in plastic bags, transferred to a growth chamber and incubated for 21 days at 5° C. in the dark without watering. Subsequently, trays were unwrapped and further incubated for 14 days at 10° C. in the light (fluorescence and red light, 350 µmol $m^{-2}$ $s^{-1}$) and watered as needed. At the end of the second incubation period, the number of emerged seedlings was counted and the ratio of healthy looking and abnormal seedlings (twisted, truncated, without coleoptiles) was determined.

Experiment 2—One Botanical, Different Application Methods

Since all in vitro experiments and the seedling emergence in soil from Experiment 1 demonstrated a superior effect of *G. chinensis* compared with the other botanicals, the following experiments were conducted solely with *G. chinensis*. As above, 2 g of *G. chinensis* powder for 100 g seed (winter wheat cultivar 'Siala', infection rate 35%) were used. With respect to the adhesives and for 100 g seed, 4.5 mL of DR or OB (40%) were applied for the slurry method, whereas 3.5 mL (2×1.75 mL) of DR or OB (50%) as described for the incubation chamber experiment were used for the coating method. In order to compare the effects of these small scale seed treatments conducted at Agroscope ART with those from large scale seed treatments, the coating method by Incotec as described for Experiment 1 was also included. Furthermore, to compare the effect of botanicals with a physical and a biological method, a treatment with warm water (45° C., 2 h) (Winter et al. 1998) and a treatment with the bacterial product Cerall® (active ingredient *Pseudomonas chlororaphis*) (Stähler Suisse SA, Zofingen, Switzerland) (1 mL for 100 g seeds) were tested as well. Treatments with the adhesives but without *G. chinensis* and untreated seeds served as controls. The number of trays and seeds per tray for each treatment was the same as in Experiment 1. Seeds were sown, incubated and seedling emergence was rated as described above.

Example 5: Field Experiment—Plant Emergence and Yield

Throughout three consecutive years, the effect of seed treatments with *G. chinensis* powder was evaluated in the field. Treatments were the same as in the growth chamber experiments, except that for the adhesive, solely OB was used. For the field experiments sown in 2008 and 2009, a single winter wheat seed lot of the cultivar 'Siala' infected with *M. majus* (35% infection rate) was chosen. For the experiment sown in 2010, another seed lot of 'Siala' (25-30% infection rate) was used.

The experiments were carried out on the experimental farm of the Research Station Agroscope ART in Zurich-Reckenholz. The soil type in 2008 and 2009 was a loamy anthrosol with 2.8% and 2.2% organic matter, respectively. In 2010, the soil type was a loamy cambisol with 2.4% organic matter. Plot size was 1.2×8.7 m and wheat was drilled at 150 kg ha$^{-1}$. Each treatment consisted of four plots. The sowing dates for the three years were Nov. 10, 2008, Oct. 21, 2009 and Nov. 3, 2010. Husbandry operations were standard for the farm except that no fungicides were applied. Seedling emergence was determined at growth stages DC 11 to DC 12 after snow melt (Zadoks et al. (1974) *Weed Research* 14, 415-421). For each plot, four rows were randomly selected while excluding the border rows and the number of emerged seedlings within 1 m of each row was counted. Assessment of seedling emergence for the different years took place on Mar. 18, 2009, Mar. 24, 2010, and on Mar. 9, 2011. Plots were combine-harvested on Jul. 30, 2009, Aug. 1, 2010, and on Jul. 25, 2011. Wheat grains were passed through a grain cleaning machine (aspiration cleaner Kongskilde KF12, Kongskilde Industries, Sorø, Denmark) to remove harvest by-products and grain yield (t ha-1) was determined at approximately 14% moisture content. Weather data were obtained from a MeteoSwiss operated weather station (SwissMetNet) located at Zurich-Reckenholz approximately 0.5 to 1 km from the experimental sites. Data included daily mean air temperature (at 2 m height) and sum of precipitation (1.5 m) and were taken according to WMO guidelines (WMO guide to meteorological instruments and methods of observation. WMO-No. 8, 7th edition, 2008, World Meteorological Organisation).

Experimental Design and Analyses

All laboratory, incubation and growth chamber experiments were set up in a completely randomised design and were performed twice. The field experiment was set up in a randomised complete block design and was conducted three times. For all experiments, results from the experimental runs were pooled. In case of a failed normality test and in order to approach normal distribution, percentage data (conidial germination rate, incidence of *M. majus* from grains, seedling emergence in growth chambers) were arc-sine transformed whereas data from radial mycelial growth, number of emerged plants in the field and yield were ln transformed before analysis of variance (ANOVA). Apart from one-way ANOVAs analysing the effect of one treatment factor only, two-way ANOVAs were also conducted for experiments where other factors than the botanicals were expected to be important (e.g. application procedure, different adhesives, years). When the overall effect of the tested factor was significant in ANOVA, an all-pairwise multiple comparison procedure according to Holm-Sidak ($\alpha$=0.05) (Holm (1979) *Scandinavian Journal of Statistics* 6, 65-70) was conducted in order to evaluate differences between treatment means. For plotting of graphs, untransformed data were used. All statistical analyses were conducted using SigmaStat® (Systat Software, San Jose, Calif., USA).

Results

In Vitro Experiment—Conidia Germination

The mean germination rate of *M. majus* conidia from the control treatment was 96%. The treatment with the synthetic fungicide Pronto® Plus completely inhibited germination (data not shown). When data from all three concentrations were combined, the reduction of germination through the four botanicals ranged between 1% (*T. vulgaris*—mean of 95% germinated conidia) and 60% (*G. chinensis*—mean of 39% germinated conidia). The reduction was highly significant (P<0.001) for *G. chinensis* at 0.5 and 1.0% as well as for *F. ulmaria* at 0.5% (FIG. 1). None of the treatments with *M. chamomilla* or with *T. vulgaris* significantly reduced the germination rate. The greatest reduction of 97% (2.5% germination) was obtained with *G. chinensis* at 1.0%.

In Vitro Experiment—Mycelium Growth

Figure 2:
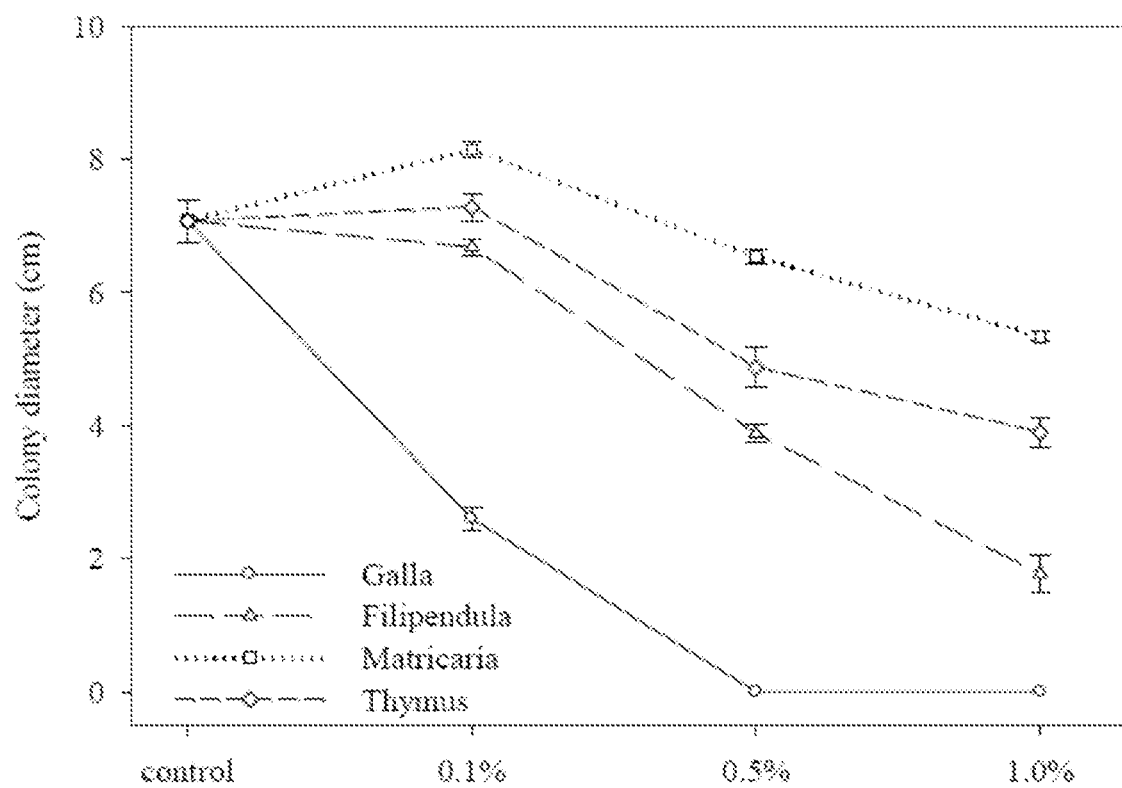
FIG. 2 is a graph that depicts an in vitro experiment showing the effect of four botanicals at three different concentrations incorporated as powder into agar on radial mycelial growth (colony diameter after 6 d) of *Microdochium majus* in vitro. Galla: *Galla chinensis*, Filipendula: *Filipendula ulmaria*, Matricaria: *Matricaria chamomilla*, Thymus: *Thymus vulgaris*. Error bars indicate the standard error of the mean.

For the control treatment, the mean colony diameter of *M. majus* after 6 days incubation was 7.1 cm. When data from all three concentrations of incorporated powders were combined, reduction of colony growth was greatest with *G. chinensis* (mean diameter 0.9 cm). Clearly less effective were incorporations by *F. ulmaria* (4.1 cm), *T. vulgaris* (5.3 cm) and *M. chamomilla* (6.6 cm) (FIG. 2). Highly significant (P<0.001) reductions of mycelial growth were obtained with *G. chinensis* at all three concentrations, for *F. ulmaria* at 0.5 and 1.0%, for *T. vulgaris* at 0.5 and 1.0% and for *M. chamomilla* at 1.0%. Incorporation of *G. chinensis* at 0.5 and 1.0% completely inhibited mycelial growth of *M. majus*.

Figure 3:
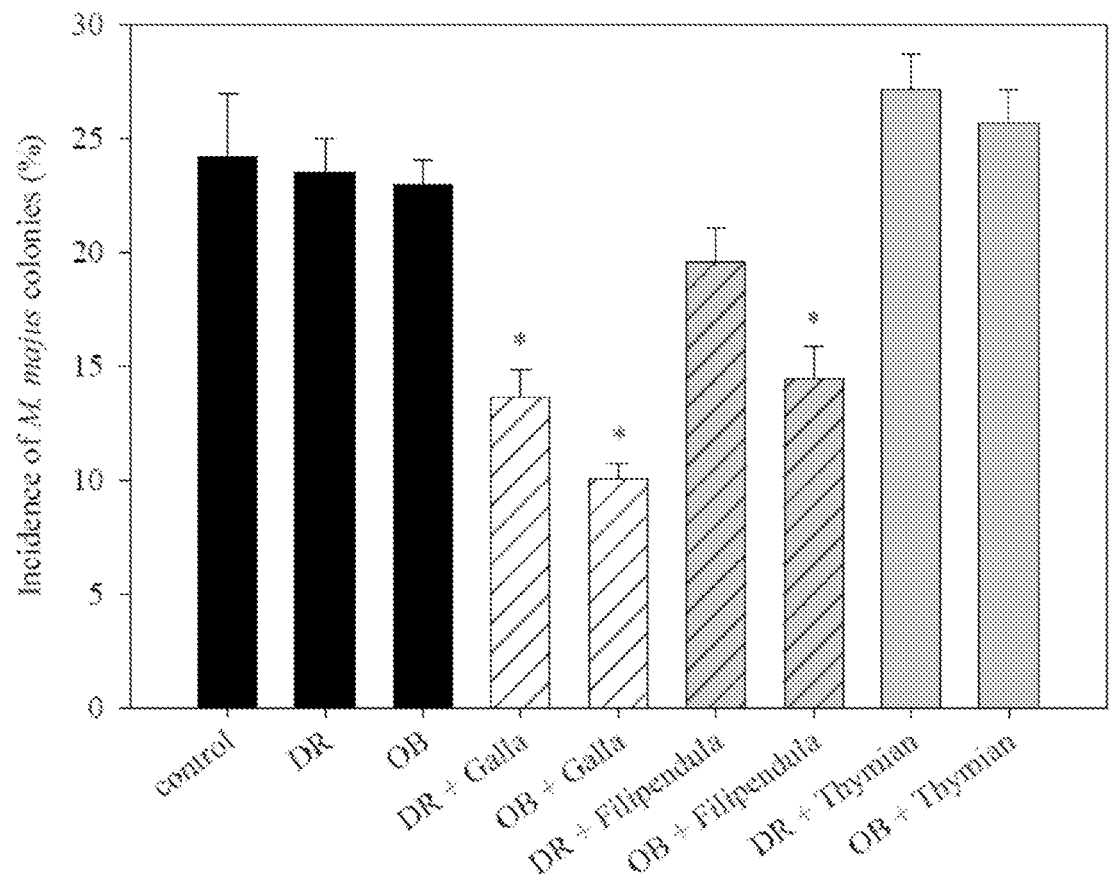
FIG. 3 is a bar graph that depicts an incubation chamber experiment showing the effect of three botanicals and two adhesives on the incidence of *Microdochium majus* colonies assessed in a seed health test. For each botanical, 2 g were used for 100 g seeds. Results from the two application methods (coating versus slurry) were pooled for plotting. DR: adhesive DiscoRed, OB: adhesive Organic Binder; Galla: *Galla chinensis*, Filipendula: *Filipendula ulmaria*, Thymus: *Thymus vulgaris*. Error bars indicate the standard error of the mean. '*' indicate treatments that were significantly different from the control treatment (at $\alpha=0.05$).

Incubation Chamber Experiment—Incidence of *M. majus* from Infected Seeds on Agar The mean incidence of *M. majus* based on the number of colonies from untreated seeds was 24% compared with 23% and 24% from seeds treated with the adhesives OB and DR, respectively, with no significant differences. For the treatments containing adhesives and botanicals, no significant difference was found between the coating and the slurry application technique (data not shown). Overall, the reduction of the fungal incidence was significantly better (P<0.006) when botanicals were applied with the adhesive OB, compared with the adhesive DR (FIG. 3). The best effect was obtained with *G. chinensis*, followed by *F. ulmaria*. The efficacy in reducing fungal incidence was significant (P<0.001) for both *G. chinensis* treatments and for the *F. ulmaria* treatment applied with the adhesive OB. The alteration of *M. majus* incidence through the botanicals compared with the control treatment ranged from an increase of 12% (DR+*T. vulgaris:* 27% incidence) to a decrease of 59% (OB+*G. chinensis:* 10% incidence) (FIG. 3).

Growth Chamber Experiment—Seedling Emergence from Soil

Figure 4:
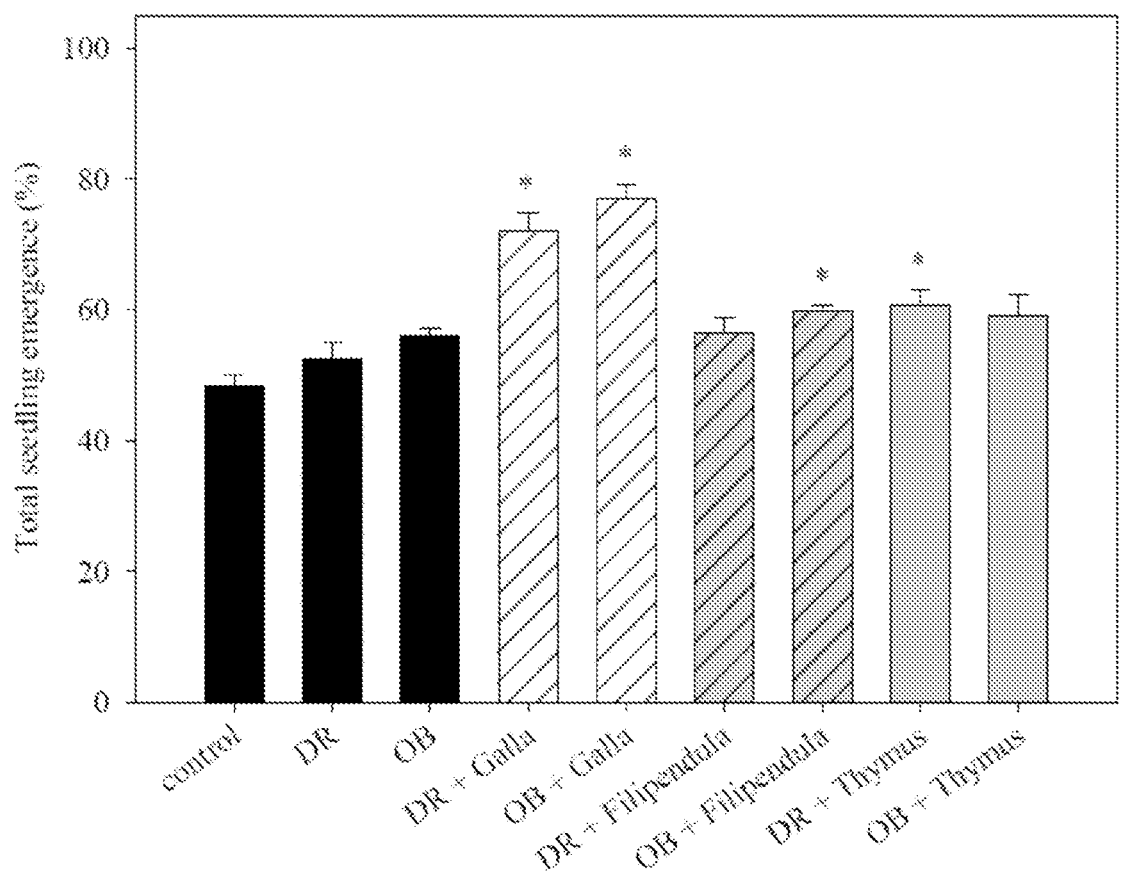
FIG. 4 is a bar graph that depicts a growth chamber Experiment 1 showing the effect of three botanicals and two adhesives on total seedling emergence from seeds infected by *Microdochium majus*. For each botanical, 2 g were used for 100 g seeds. DR: adhesive DiscoRed, OB: adhesive Organic Binder; Galla: *Galla chinensis*, Filipendula: *Filipendula ulmaria*, Thymus: *Thymus vulgaris*. All treatments were performed by an encrusting and pelleting process using a rotary batch coater. Error bars indicate the standard error of the mean. '*' indicate treatments that were significantly different from the control treatment (at $\alpha=0.05$).

In Experiment 1 with three botanicals and the two adhesives applied by Incotec, mean emergence of total and healthy seedlings from the control treatment was 49 and 42%, respectively. The adhesives DR and OB without botanicals showed no significant effect on total seedling emergence (FIG. 4). Treatment with botanicals resulted in a mean increase of total emerged seedlings between 16 and 59%. Highly significant (P<0.001) effects were observed for both treatments with *G. chinensis* (emergence with DR: 72%, with OB: 77%), both *T. vulgaris* treatments (with DR: 61%, with OB: 59%) and for the *F. ulmaria* treatment with OB (60%) (FIG. 4). The effect of the botanicals on the ratio of healthy seedlings was similar. However, apart from the superior *G. chinensis* treatments (with DR: 66%, with OB: 71%), only the *T. vulgaris* treatment with DR (55%) significantly (P<0.001) increased the ratio of healthy looking seedlings when compared with the control treatments (data not shown).

Figure 5:
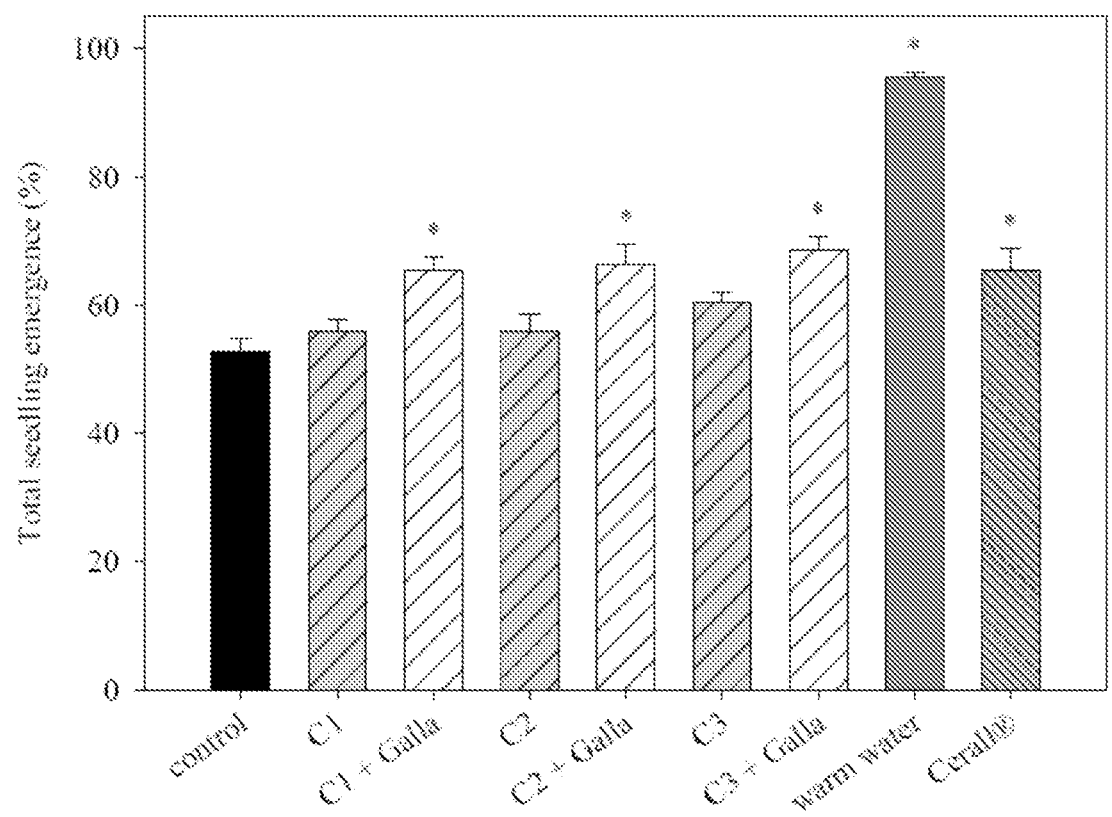
FIG. 5 is a bar graph that depicts a growth chamber Experiment 2 showing the effect of *Galla chinensis* and an adhesive with a slurry or a "sandwich" coating technique as well as a warm water and a bacterial treatment on total seedling emergence from seeds infected by *Microdochium majus*. Galla: *Galla chinensis* (2 g 100 g seeds$^{-1}$); C1: seed coating by Incotec with the adhesive Organic Binder (OB) at 50%; C1+Galla: C1 applying *G. chinensis* with a slurry technique; C2: seed coating by Agroscope ART with OB at 50%; C2+Galla: C2 applying *G. chinensis* with a "sandwich" technique; C3: seed coating by Agroscope ART with OB at 40%; C3+Galla: C3 applying *G. chinensis* with a slurry technique; warm water: 45° C., 2 h; Cerall®: Bacterial product at 1 ml 100 g seeds$^{-1}$. Error bars indicate the standard error of the mean. '*' indicate treatments that were significantly different from the control treatment (at $\alpha=0.05$).

In Experiment 2 using *G. chinensis* applied with different techniques as well as a warm water and a Cerall® treatment, the mean emergence of total and healthy seedlings from the control treatment was 53 and 42%, respectively. None of the treatments with the adhesive OB without *G. chinensis* showed a significant effect on total seedling emergence (FIG. 5). There was a highly significant (P<0.001) increase of total and healthy emerged seedlings following a treatment including *G. chinensis* with different application techniques, with mean emergence between 65 and 69% and between 54 and 58%, respectively. The application techniques used by Agroscope ART led to slightly higher total seedling emergence compared with the technique by Incotec, but the differences were not significant (FIG. 5). The emergence following a treatment with Cerall® was similar (total emergence: 66%; healthy: 55%) to that with *G. chinensis* treatments. The effect of the warm water treatment was substantially greater than all other treatments, resulting in a mean emergence of 96% total seedlings (FIG. 5) and 93% healthy seedlings (data not shown).

Field Experiment—Plant Emergence and Yield

Figure 6A:
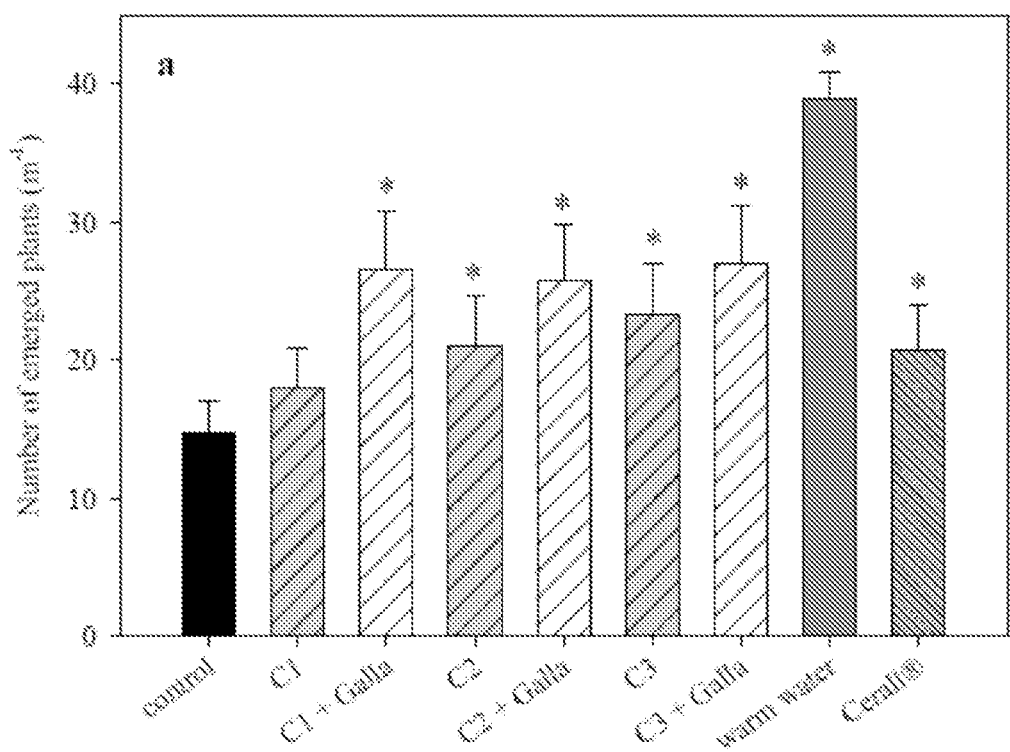
FIGS. 6A and 6B are bar graphs depicting field experiments 2009 to 2011, which show the effect of *Galla chinensis* and an adhesive using a slurry or a "sandwich" coating technique, a warm water and a bacterial treatment on (a) number of emerged plants per row and (b) yield from seeds infected by *Microdochium majus*. Galla: *Galla chinensis* (2 g 100 g seeds$^{-1}$). C1: seed coating by Incotec with the adhesive Organic Binder (OB) at 50%; C1+Galla: C1 applying *G. chinensis* with a slurry technique; C2: seed coating by Agroscope ART with OB at 50%; C2+*Galla*: C2 applying *G. chinensis* with a "sandwich" technique; C3: seed coating by Agroscope ART with OB at 40%; C3+*Galla*: C3 applying *G. chinensis* with a slurry technique; warm water: 45° C., 2 h; Cerall®: Bacterial product at 1 ml 100 g seeds$^{-1}$. Error bars indicate the standard error of the mean. '*' indicate treatments that were significantly different from the control treatment (at α=0.05).
Figure 6B:
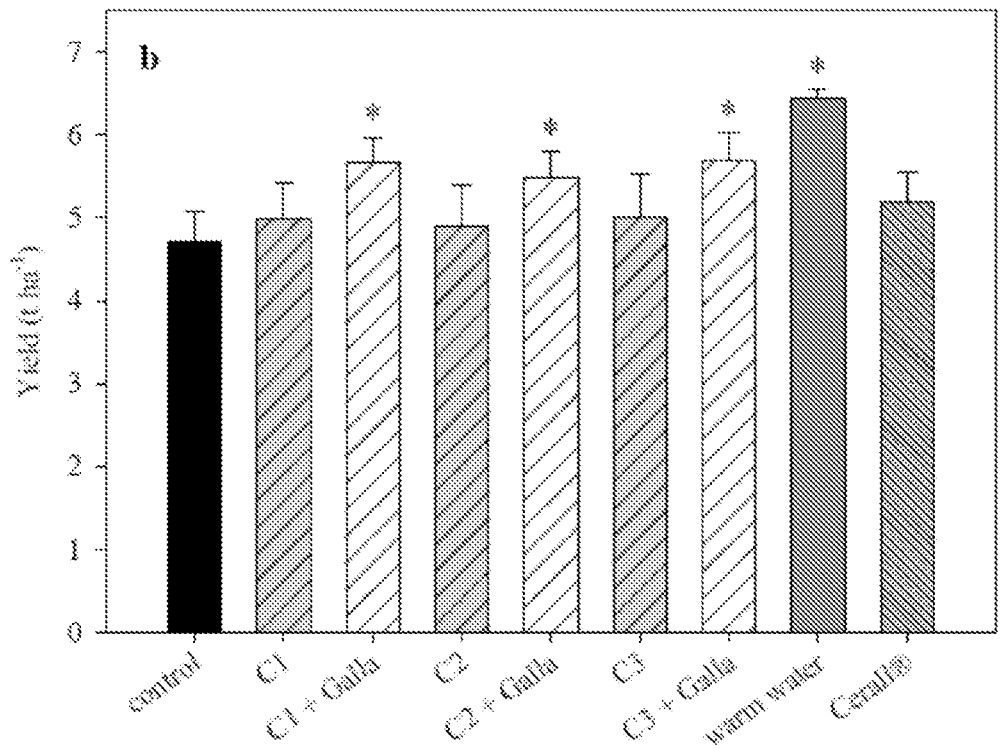

There were highly significant interactions (P<0.001) between the effect of the year and the treatment on plant emergence and yield. From all three years, the winter after sowing in 2008 was the coldest with the longest snow cover whereas the winter after sowing in 2010 was the warmest with the lowest amount of precipitation. The lowest and highest temperature immediately after sowing was recorded for 2008 and 2010. When data were combined over all treatments, the average number of plants within 1 m of each row showed a large range from 10 (2009) up to 34 plants (2011) and for the yield from 3.8 (2009) up to 6.3 t ha$^{-1}$ (2011). Nevertheless, even when data were combined over all three years, differences were observed between the seed treatments. The average number of emerged plants from the control treatment was 15 within 1 m. The number of plants in treatments containing the adhesive OB without *G. chinensis* ranged between 18 and 23, whereas in the treatments containing OB together with *G. chinensis*, the number ranged between 26 and 27 (FIG. 6a). The Cerall® treatment resulted on average in only 21 plants and warm water was the best treatment, resulting on average in 39 plants within 1 m (FIG. 6a). The two-way ANOVA with the factors year and seed treatment separated, demonstrated highly significant effects from all treatments containing *G. chinensis*, from Cerall® and also from the two treatments containing OB only (FIG. 6a). The yield from seeds of the untreated control was 4.7 t ha$^{-1}$. Seeds treated with *G. chinensis* resulted in a yield between 5.5 and 5.7 t ha$^{-1}$ whereas yield from seeds that received only the adhesives, ranged between 4.9 and 5.0 t ha$^{-1}$. The average yield from the Cerall® and the warm water treatment was 5.2 and 6.5 t ha$^{-1}$, respectively (FIG. 6b). The two-way ANOVA showed highly significant effects on yield from all treatments containing *G. chinensis* on yield (P<0.001) (FIG. 6b).

DISCUSSION

In the above in vitro experiments, *G. chinensis* was substantially more effective compared with other botanicals and higher concentrations of *G. chinensis* greatly or completely inhibited *M. majus* conidia germination and mycelial growth. Remarkably, the efficacy of *G. chinensis* at a concentration of 1% was almost as high as that from the synthetic fungicide Pronto® Plus, resulting in 97% or 100% reduction of conidia germination, respectively. Bearing the different target sites in mind, it was not surprising that the pattern of results on conidia germination was not always equivalent to that on mycelium growth. In fact, treatments with *T. vulgaris* did not reduce germination of *M. majus* conidia whereas high concentrations of *T. vulgaris* powder incorporated into agar significantly reduced mycelial growth. In general, the effects of botanicals on conidia germination were clearly smaller than those observed on mycelium growth, except for *G. chinensis*. The findings from the in vitro experiments were confirmed in the following in planta test systems. All *G. chinensis* treatments had a substantially higher efficacy compared with those from *F. ulmaria* or *T. vulgaris*. Thus, it has been demonstrated that the medicinal herb *G. chinensis* applied to seeds has the potential to control *M. majus* through improved plant emergence resulting in increased yield in infested seed lots. As regards the fungicidal activity, the warm water treatments were clearly superior compared with the bacterial product and the botanicals. However, treatment with warm water affords longer re-drying processes, e.g. of seeds, which are usually too costly for the crop industries. Overall, therefore, treatment with *G. chinensis* offers excellent control of fungal phytopathogens at reasonable costs.

The invention claimed is:

1. A method for controlling a fungal phytopathogen or preventing infection of a plant by a fungal phytopathogen comprising the step of contacting the plant, plant parts, its seed, soil and/or habitat with an effective amount of a preparation containing *Galla chinensis,* wherein the preparation containing *Galla chinensis* is used in a composition further containing at least one phytologically acceptable adhesive;

wherein the preparation containing *Galla chinensis* is substantially complete *Galla chinensis* in pulverized form in water, and wherein the phytologically acceptable adhesive is starch, talcum, synthetic binders, or a mixture thereof.

2. The method of claim 1 wherein the preparation containing *Galla chinensis* contains *Galla chinensis* meal.

3. The method of claim 1 wherein the step of contacting the plant, plant parts, its seed, soil and/or habitat is combined with treating the plant, plant parts, its seed, soil and/or habitat with an effective amount of hot air, having a temperature of from 55 to 80° C.

4. The method of claim 3 wherein the hot air has a relative humidity of not more than 5% or more than 85%.

5. A method for controlling a fungal phytopathogen or preventing infection of a plant by a fungal phytopathogen comprising the steps of:

treating a plant seed with at least one phytologically acceptable adhesive; and contacting the seed with a preparation containing substantially complete *Galla chinensis* in pulverized form in water, wherein the phytologically acceptable adhesive is starch, talcum, synthetic binders, or a mixture thereof.

6. The method of claim 1 wherein the fungal phytopathogen is selected from the group consisting of Ascomycetes, Basidiomycetes and Oomycetes.

7. The method of claim 6 wherein the Ascomycete is selected from the group consisting of the genera *Microdochium, Gibberella, Claviceps, Gaeumannomyces, Epichloe, Sclerotinia, Leptosphaeria, Pyrenophora, Venturia*, and *Mycosphaerella*.

8. The method of claim 7 wherein the fungus is selected from the group consisting of *Microdochium majus, Microdochium nivale, M oryzae, M tabacinum* and *M triticicola*.

9. The method of claim 1 wherein the plant is selected from cereals, beets, fruits, leguminous plants, oil plants, cucurbits, fiber plants, citrus fruits, vegetables, lauraceous plants, grapes, tobacco, *Stevia*, natural rubber plants, grasses, ornamental and forestry plants.

10. The method of claim 1 wherein the preparation consists essentially of *Galla chinensis* meal.

11. The method according to claim 3, wherein the hot air having a temperature of from 60 to 75° C.

12. The method according to claim 5, further comprising treating the seed again with the at least one phytologically acceptable adhesive.

13. The method according to claim 1, wherein the *Galla chinensis* is ground to a mesh size from about 0.001 mm to about 0.2 mm.

14. The method according to claim 5, wherein the *Galla chinensis* is ground to a mesh size from about 0.001 mm to about 0.2 mm.

* * * * *